United States Patent [19]

Buemi

[11] 4,332,823

[45] Jun. 1, 1982

[54] FABRICATED MEAT AND MEAT BY-PRODUCTS AND PROCESS

[75] Inventor: Dennis P. Buemi, Schnecksvilles, Pa.

[73] Assignee: Liggett Group Inc., Montvale, N.J.

[21] Appl. No.: 138,190

[22] Filed: Apr. 7, 1980

[51] Int. Cl.$^3$ ................................................ A23L 1/31
[52] U.S. Cl. ...................................... 426/272; 426/513; 426/641; 426/646; 426/652; 426/656; 426/802; 426/805
[58] Field of Search ............... 426/272, 641, 644, 645, 426/646, 648, 649, 652, 656, 509, 513, 518, 519, 802, 805

[56] References Cited

U.S. PATENT DOCUMENTS

| | | | |
|---|---|---|---|
| 3,574,633 | 4/1971 | Flier | 426/646 |
| 3,903,313 | 9/1975 | Maher et al. | 426/641 X |
| 3,914,459 | 10/1975 | Jones | 426/646 X |
| 3,982,004 | 9/1976 | Obata et al. | 426/641 |
| 4,006,266 | 2/1977 | Bone et al. | 426/641 X |
| 4,011,346 | 3/1977 | Ernst | 426/805 X |
| 4,048,342 | 9/1977 | Haas et al. | 426/805 X |
| 4,055,681 | 10/1977 | Balaz et al. | 426/805 X |
| 4,219,576 | 8/1980 | Kawasaki et al. | 426/656 X |

FOREIGN PATENT DOCUMENTS 495306  1/1977  Australia .............................. 426/646

*Primary Examiner*—Arthur L. Corbin
*Attorney, Agent, or Firm*—Kenyon & Kenyon

[57] ABSTRACT

A process for preparing fabricated meat and meat by-products comprising the steps of: emulsifying meat or meat by-products; admixing a salt with the emulsified material; admixing texturized soy with the emulsified meat and salt; forming the admixture into a desired shape; and blanching the shaped admixture in a temperature range of 170° F.–210° F.

9 Claims, No Drawings

FABRICATED MEAT AND MEAT BY-PRODUCTS AND PROCESS

This invention relates to fabricated meat and meat by-products and particularly such products which are fabricated into the form of chunks. The fabricated meat and meat by-products made according to the process of this invention are advantageously used as pet foods or as ingredients for chunk pet foods, and preferably for dog foods.

Fabricated meat products are known to be prepared by the admixture of grains and cereals and derivates thereof to meat and meat by-products in order to act as extenders, stiffeners and binding agents.

The present invention avoids the use of grains and cereals as a component of the fabricated meat and meat by-products. The process of this invention comprises the steps of reducing the size of meat and meat by-products, such as by grinding and thereafter emulsifying the ground meat and meat by-products. The emulsified meat is then mixed with a salt which is capable of extracting salt soluble protein from the meat and meat by-products. Such proteins act as a binder for the fabricated meat and meat by-products, and advantageously bind the fabricated meat and meat by-products in the absence of other binders such as grain, cereal, or dairy and meat derivatives conventionally used in connection with the preparation of pet food products. Following emulsification and salt extraction of the protein from the meat and meat by-products, mixing is continued and texturized soy is added while mixing continues. The addition of the texturized soy product acts to stiffen the meat and meat by-product preparatory to its being formed into chunks.

The texturized soy allows forming of the meat and meat by-product into a chunk form by providing structural rigidity to the formed chunks. The skeletal matrix of the texturized soy also provides surfaces for protein gelatinaceous binding and helps form the internal rigid structure for the chunks to be formed thereafter. The soy also extends the yield of the meat and meat by-products through the subsequent blanching and cooking steps. After mixing with texturized soy, the mass is formed, desirably into chunks, to resemble whole meat chunks. The chunks are then heated in a water bath, known as blanching. At the blanching temperature the salt soluble protein is gelatinized, preferably within the texturized soy backbone structure. The gelatinized protein in the formed chunks of meat and meat by-products cause setting or stiffening of the formed chunks of fabricated products.

The set chunks of fabricated meat and meat by-products may then be admixed with other meat and meat by-products, for example chunks of meat, thereby extending the quantity of such meat and meat by-products for use in pet foods.

The final product is a relatively firm composition which possesses texturized qualities similar to whole chunks of meat and meat by-products. Notwithstanding the presence of the texturized soy, this product has been found not to adversely affect the palate of pets, and does not possess the usual adverse palatability reaction in dogs when fed usual combinations of meat and soy. In fact, tests have shown that the increased soy content of the fabricated meat and meat by-products of this invention do not act as the usual deterrent to increased palatability. Palatability to dogs of the products of this invention in tests have shown to be at approximately the same level as beef meat and meat by-products containing lesser amounts of soy. Therefore, it is quite surprising that palatability has not been affected by additional soy in the fabricated meat and meat by-products herein, but that a nutritious and well-balanced food of high soy content and in chunk form can now be fed to dogs without adverse palate reaction.

The meat and meat by-products used to prepare the fabricated chunks herein may include the usual meat and meat by-products derived from slaughterhouses. In addition, the whole carcass of horse, lamb, beef and chicken may be ground and emulsified as the meat and meat by-products.

Ground bone may optionally be included in the formulation as a water emulsion of the ground bone. Bone provides a source of calcium and phosphorus in the pet food product.

Fat may also be separately added. However, a high fat content has an adverse effect on the binding properties of the meat and meat by-products. Hereinafter, the combination of meat and meat by-products as used herein includes the bone content and fat content of the product.

The preferred salt used in the process of this invention is sodium chloride. It performs efficiently to extract the salt soluble proteins utilized as binders for the emulsified meat and meat by-products. Other salts include potassium chloride and potassium and sodium phosphates and polyphosphates, the latter phosphate and polyphosphate salts being particularly useful when used used in combination with poultry.

Texturized soy may be obtained as a commercial product and is commercially sold under tradenames such as Nabisco VMR, and TVP sold by Archer-Daniels-Midland. Preferably the texturized soy has a maximum size of about 3/16 inch for maximum utility in this invention. Larger sized material tends to interfere with the textural qualities of the final chunk product and homogeneous textured appearance.

Optionally ground bone may be added at the time the salt is added to the emulsified meat and meat by-products.

In the preferred embodiment of the process for making fabricated meat and meat by-products chunks, frozen meat and meat by-products, in the temperature range of about 21° F. are ground in commercial grinders and then emulsified while still in the semifrozen state. The temperature of the emulsified meat and meat by-products may rise to approximately 23° F. No water, other than the water component of the meat and meat by-products, is added during the grinding and emulsification steps.

Thereafter the meat is conveyed to a mixing vessel where the salt is added and mixing is permitted to continue for several minutes, usually approximately 3–8 minutes. During the mixing time the temperature rises and the salt solution extracts and solubilizes the necessary proteins from the meat and meat by-products.

In general, the structural qualities of fabricated meat and meat by-product chunks are attributed to the protein myofibribullar (muscle) fractions, namely, myosin and actomyosin. The instant process uses salt, preferably sodium chloride, to extract the structure enhancing proteins from the emulsified meat and meat by-products used in this process. In the process described herein these protein fractions are extracted from the emulsified meat as a salt solution. Continued mixing of the salt extracted protein in the mixing stage acts to materially improve the binding properties of the resultant fabricated meat and meat by-product. It is believed that the proteins, upon extraction and mixing, coat the fat globules, meat particles and texturized soy causing the coated particles to agglomerate to one another. During subsequent cooking steps, the coated particles form a proteinaceous gel which furnishes the rigid textural structure desired, and also retains moisture and fat.

After sufficient mixing to assure protein extraction and solubilization, the protein-salt solution and emulsified meat mass is further mixed while texturized soy is added thereto. Mixing continues until the soy has been uniformly distributed throughout the mass and the salt-soluble protein has coated the texturized soy. Generally, this is accomplished within an additional 3–8 minutes. During that time the temperature generally rises in the range of about 44° F. As stated above the texturized soy provides the matrix or surface on which the solubilized protein is gelatinized during the subsequent blanching process and thereby serves to give structural rigidity to the fabricated meat and meat by-products.

The meat and texturized soy mass is thereafter formed into small chunks in equipment used to form the chunk products. Chunks may be formed in a cylindrical shape of approximately ⅝ inch diameter by 1 inch in height. The temperature of the chunk mass when it exits the forming machine may be in the range of about 46° F. Thereafter, the chunks are placed in a blancher where the temperature of the water is maintained in the range of 170° F.–210° F. for approximately 3–6 minutes. The optimum temperature is about 200° F.–210° F. The higher the temperature the shorter the residence time required. In the blancher the protein is gelatinized or set thereby providing structural rigidity to the formed chunks. The set chunks are permitted to cool and thereafter may be used as a component of pet food products such as by combination with other meat and meat by-products in chunk or other forms. Thereafter, the product may be cooked and packaged, and marketed and used as a pet food.

The need for structure enhancing protein in most commercialized applications is not necessary since the use of the muscle fraction of meat is extensive and the availability of soluble protein is not limited. However, in the preferred embodiment of this invention meat and meat by-products having limited amounts of soluble protein are advantageously used without other binding agents, and therefore it is economically necessary to extract the protein fraction described in order to maximize the availability of the proteins and provide the chunk meat characteristic structural qualities in the fabricated meat and meat by-products of this invention.

The chunk fabricated meat and meat by-products resemble the relatively rigid structural composition and textured qualities similar to whole chunk meat, and have been found to be palatable to pets.

In the fabricated meat and meat by-products, the binding characteristics are dependent upon three conditions: the amount of salt soluble protein available therein, the amount and size of the fat globule in relation to the soluble protein available, and the moisture present and somewhat by the emulsion temperature of the meat. Large fat globules inhibit the surrounding protein while the smaller globules increase the surface area subsequently diluting protein gel strength. Increased proportions of fat also tend to have an adverse effect on the fabricated meat and meat by-product, particularly when a structurally rigid formed meat and meat by-product is required. Larger amounts of fat, particularly at high temperatures, tend to cause the fat to smear and prevent its incorporation into the proteinaceous gelatin. Generally, the fat-containing emulsified meat and meat by-product should not be permitted to rise beyond about 90° F. through the forming step, and the preferred maximum temperature is in the range of 35° F.–50° F. with about 44° F. being the most desired temperature. At temperatures within the preferred temperature range the adverse smearing effects of the fat are minimized.

In the preferred temperature of between about 35° F.–50° F. maximum protein is extracted during the salt extraction step. Within this temperature range minimal protein is denatured permitting a good blend of the salt solubilized protein, emulsified meat and texturized soy.

During the blanching step, however, when the protein is denatured to form the gelatinaceous mass, the preferred temperature range is 170° F.–210° F.

The moisture content of the fabricated meat and meat by-product made by the process herein is maintained at about 70% or less. Excessive moisture thins the consistency of the emulsion mixture and has an adverse effect upon the subsequent forming step in that the high moisture content of the fabricated meat and meat by-product tends to reduce the ability of the product to maintain a structurally rigid shape after being formed. Water in the meat or meat by-product is usually sufficient to meet the stated water content range.

As to the meat and meat by-products used herein, these products comprise four essential components, namely, protein, fat, water and ash. The usual proportion of the components of the meat and meat by-product used to make the fabricated meat and meat by-product herein and the preferred range are shown below in Table I. The proportions are sufficient to provide a fabricated meat and meat by-product which will function in the manner described herein to provide a relatively rigid structure, preferably in chunk form, which resembles meat and meat by-products.

The following proportions are in terms of weight-percent for the meat and meat by-product.

TABLE I

| Component of Meat and Meat By-Product | Usual Range | Preferred Range |
| --- | --- | --- |
| Protein | 8–20 | 15–20 |
| Fat | 8*–20 | 10–15 |
| Water | 50–70 | 55–65 |
| Ash | .5–10 | 1–3 |

*Where the meat and meat by-product contains sufficient fat required for the product, no additional fat is added.

The meat and meat by-product itself may also include ground bone which is preferably added to the other meat components in the form of a water emulsion. The water-bone emulsion preferably contains approximately 70% by weight of ground bone and 30% water. When emulsified bone is added to the meat component, it may be added in amounts of up to 55% of the total weight of meat and meat by-product in the fabricated meat and meat by-product of this invention.

The ground bone emulsion is preferably added to the mass during the salt addition step. The ground bone, when included in the product, is preferably made up of high percentages of veal and lamb rack.

The following Table II shows the preferred range of weight percent of components used in the fabricated meat and meat by-product of this invention.

TABLE II

| Ingredient | Range (Weight-Percent) |
| --- | --- |
| Meat and Meat By-Product (including Bone) | 77–92 |
| Salt | 1.5–3 |
| Phosphates | 0–.3 |
| Texturized Soy | 8–20 | pH is not critical so long as it is in the range of about neutral. None of the ingredients used to prepare the fabricated meat and meat by-product has a material effect on the pH.

Other ingredients may be added during the process of preparing the fabricated meat and meat by-product, including soy flour, water sufficient to raise the moisture content to about 65%, dried egg powder, other meat protein derivatives, egg albumen and food color.

The following examples are based upon 100 pounds of ingredients for each formulation described.

EXAMPLE 1

86 pounds of frozen beef carcass are ground in a commercial beef grinder and thereafter passed to a commercial emulsifying machine where the ground meat is emulsified. Upon exiting from the emulsifier the meat is at a temperature of approximately 28° F. The emulsified meat is conveyed to a mixing tank where 2 pounds of sodium chloride are added and mixing of the emulsified meat and salt is permitted to continue for approximately 6 minutes. During that time the temperature of the mass rises to approximately 33° F. The salt is dissolved in the water content of the emulsion and extracts the soluble protein from the meat. Thereafter, 12 pounds of TVP soy is added and mixing is continued for about 6 minutes. Upon exiting from the mixing vessel the temperature has gone up to approximately 44° F. Thereafter, the mass is conveyed to a chunk former machine where the cylindrical chunks approximately $\frac{7}{8}$ inches in diameter and 1 inch in height are formed. The small cylindrical chunks of the meat mass are removed from the forming machine and conveyed to a water blancher which is maintained at approximately 200° F.–210° F. The chunks have a residence time in the blancher of approximately 4 minutes during which time the external parts of the chunks reach about that temperature. Upon removal from the blancher the chunks are relatively structurally rigid and ready for admixture with other chunk meat products to form a pet food product for commercial use.

EXAMPLE 2

The process of Example 1 is repeated except that the 86 pounds of ground beef carcass are replaced by 30 pounds of beef livers and 52 pounds of poultry by-products. The sodium chloride content is increased to 3 pounds, and 0.3 pounds of sodium phosphate are also added with the sodium chloride. TVP fines are added in proportion of 14%. The rest of the process is carried out as described in Example 1.

EXAMPLE 3

The process of Example 1 is repeated except that the ground beef carcass is replaced by 67½ pounds of beef gullet and 20 pounds of a water-bone emulsion consisting of 70% ground bone and 30% water. The sodium chloride proportion is 2½ pounds and TVP soy is reduced to 10 pounds in this formulation. The other process steps of Example 1 are repeated.

EXAMPLE 4

The product of Example 1 is admixed with 400 pounds of meat and meat by-product chunks, cooked, and packaged in cans for commercial use.

EXAMPLE 5

A fabricated meat and meat by-product made in accordance with this invention was fed to dogs for purposes of testing palatability. The dogs were also offered a control formulation having a lesser soy content. The following ingredients and proportions, in pounds, were prepared and the dogs were fed portions as their daily diet.

| Ingredients | Formulation 902 | Control |
| --- | --- | --- |
| Lean Beef | 280 | 280 |
| Trim (Beef-High Fat) | 298 | 298 |
| Udders | 367 | 367 |
| Lungs | 1628 | 1682 |
| Bone | 583 | 583 |
| Gullets | 333 | 315 |
| TVP Soy | 332 | 262 |
| Salt (Approximate) | 17.5 | 17.5 |

A standard portion of each formulation was placed before 12 dogs for 10 days. The results indicate that approximately 53% of the control formulation was eaten by the dogs over this period of time and 47% of the 902 formulation was eaten by the dogs over this same period of time. The preference ratio on a percentage basis is 1.1 to 1. In terms of the statistical significance of the evaluation, palatability is interpreted as no difference between the two formulations. Accordingly, there is no adverse palatability effect on dogs from the higher soy content of the formulations of this invention.

It will be understood that it is intended to cover all changes and modifications of the examples of the invention herein chosen for the purpose of illustration which do not constitute departures from the spirit and scope of the invention.

I claim:

1. A process for preparing fabricated meat and meat by-products comprising the sequential steps of:
    (a) emulsifying meat or meat by-products;
    (b) admixing a salt, with said emulsified meat or meat by-products, in a weight-percent proportion of 1.5–3% based on the weight of said fabricated product, said salt being present in proportion sufficient to extract salt soluble protein from said emulsified meat or meat by-products said salt being selected from the group consisting of sodium chloride, potassium chloride, sodium phosphate, potassium phosphate, sodium polyphosphates and potassium polyphosphates;
    (c) extracting said salt soluble protein from said meat and meat by-products;
    (d) admixing texturized soy with said emulsified meat or meat by-products, extracted protein and salt;
    (e) forming said admixture into a desired shape;
    (f) blanching said shaped admixture in a temperature range of 170° F.–210° F.; and
    (g) thereafter maintaining the mosiure content of said fabricated meat and meat by-products in the range of up to about 70%,
    the weight-percent proportions of said ingredients being:

meat and meat by-products: 77–92%
texturized soy: 8–20%.

2. The process of claim 1 including the step of admixing ground bone with the emulsified meat or meat by-products before or with said salt admixing step.

3. The process of claim 1 wherein said salt is sodium chloride.

4. The process of claim 1 wherein said meat or meat by-product includes poultry and said salt includes a phosphate or polyphosphate salt.

5. The process of claim 1 wherein up to 55 weight percent of the meat or meat by-product is a water-ground bone emulsion and said emulsion is admixed with the meat or meat by-products before or with said salt admixing step.

6. The product of the process of claim 5.

7. The process of claim 1 wherein said emulsifying is carried out, while said meat and meat by-products are at least partially frozen, without addition of water.

8. The process of claim 1 including the step of admixing said blanched and shaped admixture with meat and meat by-products.

9. The product of the process of claim 1.

* * * * *